United States Patent [19]
Olson et al.

[11] Patent Number: 5,458,214
[45] Date of Patent: Oct. 17, 1995

[54] SAFETY APPARATUS

[75] Inventors: Wayne L. Olson, Central Point, Oreg.; Gary E. Choate, Lakewood, Colo.

[73] Assignee: Rose Systems, Inc., Englewood, Colo.

[21] Appl. No.: 172,093

[22] Filed: Dec. 23, 1993

Related U.S. Application Data

[63] Continuation-in-part of Ser. No. 960,913, Oct. 14, 1992, abandoned.

[51] Int. Cl.$^6$ .................................................. A62B 35/00
[52] U.S. Cl. ................................................ 182/18; 182/3
[58] Field of Search ......................... 182/3, 18; 248/613; 267/71

[56] References Cited

U.S. PATENT DOCUMENTS

| | | | |
|---|---|---|---|
| 1,258,102 | 3/1913 | Foster | 261/71 |
| 2,665,123 | 1/1954 | Guffey | 248/613 |
| 2,678,976 | 5/1954 | Roy | 248/613 |
| 4,589,523 | 5/1986 | Olson et al. | |
| 5,105,907 | 4/1992 | Lebow | 182/3 |

Primary Examiner—Alvin C. Chin-Shue
Attorney, Agent, or Firm—Klaas, Law, O'Meara & Malkin; Joseph J. Kelly

[57] ABSTRACT

A shock absorbing device for a generally horizonal lifeline wherein one end of the lifeline is mounted at fixed location, the other end of the lifeline is connected to one end of the shock absorbing device, one end of a turnbuckle is connected to the other end of the shock absorbing device and the other end of the turnbuckle is mounted at a fixed location. The shock absorbing device has a frangible bolt that breaks when a predetermined amount of force is applied thereto, which force is then absorbed by shock absorbing device. Also, shock absorbing devices are used to connect electric power cables to spaced apart supports.

16 Claims, 3 Drawing Sheets

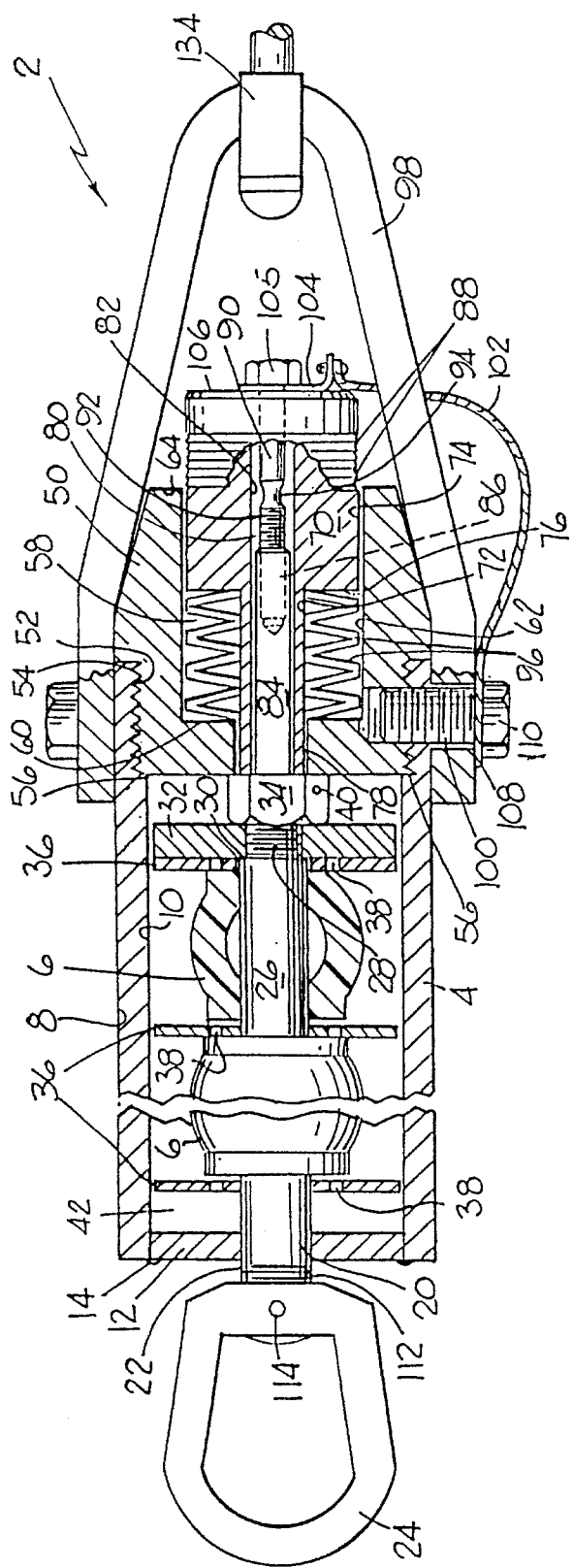
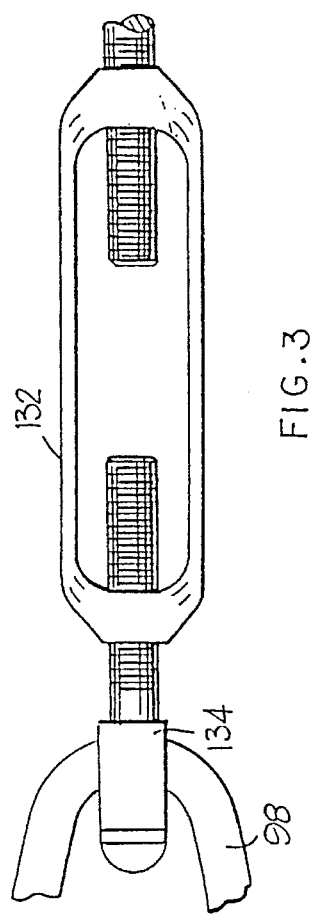
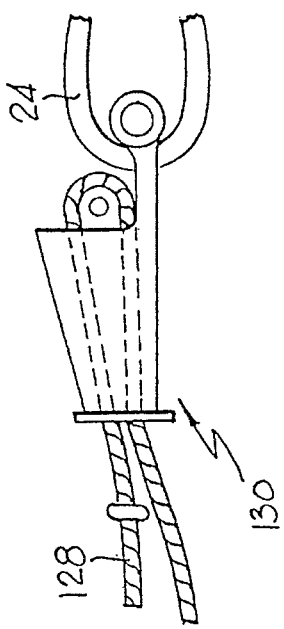
FIG.1
FIG.3
FIG.2

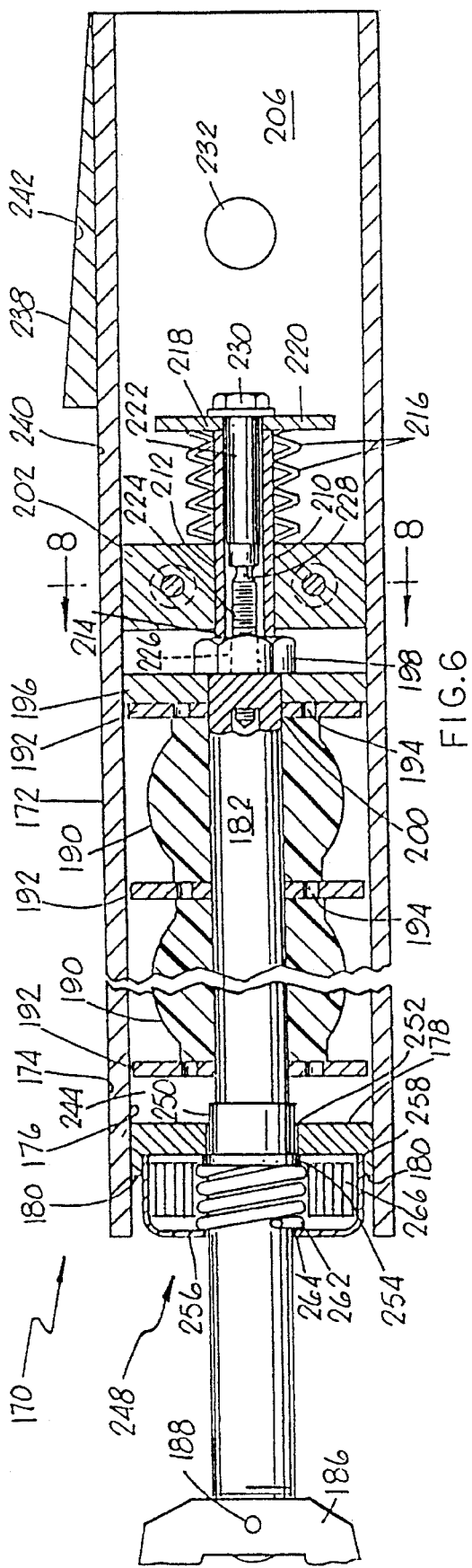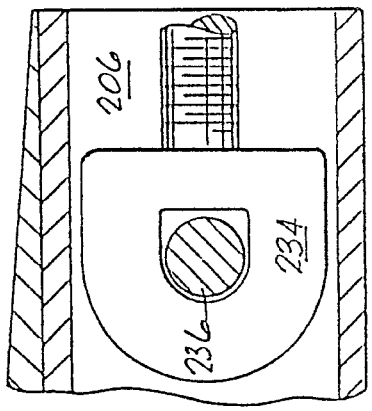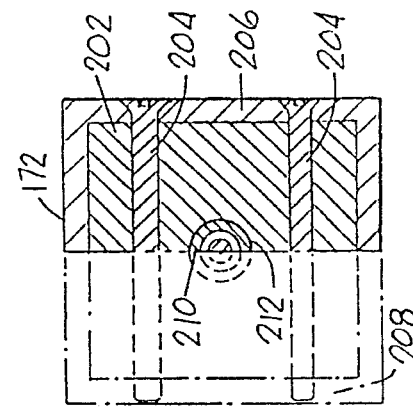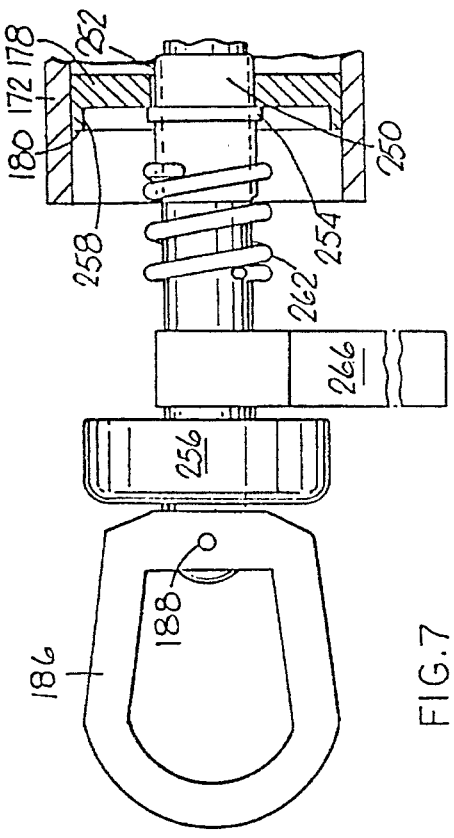

5,458,214

SAFETY APPARATUS

This application is a continuation-in-part of United States Patent Application Serial No. 07/960,913 filed Oct. 14, 1992, now abandoned for SAFETY APPARATUS of Wayne L. Olson and Gary E. Choate.

FIELD OF THE INVENTION

This invention relates generally to safety apparatus having shock absorbing means and more particularly to safety apparatus having shock absorbing means for use with a horizontal lifeline and for other uses, such as in absorbing shock loads on electric power cables.

BACKGROUND OF THE INVENTION

In construction work, such as in the building of bridges, it is necessary to provide workers with safety apparatus to protect them in the event of a fall. One such safety apparatus involves the use of a horizontal lifeline which extends between two spaced apart fixedly mounted anchors. It is customary to have the worker attach a pulley to the lifeline and to attach a fall arrestor such as that described in U.S. Pat. No. 4,589,523 which is incorporated herein by reference thereto, to the pulley and to a harness worn by the worker. A turnbuckle is used to adjust the tension in the lifeline. The amount of sag in the lifeline is critical since the pulley must be moved over the cable as the worker moves. Also, the tension in the lifeline is critical since this determines the angle of sag in a lifeline which in turn determines the load amplification by which a vertical fall arrest force applied to the lifeline is multiplied by. Therefore, it is important to know the amount of tension applied to a lifeline. It is also desirable to have a shock absorber to absorb the initial force placed on the anchor of the lifeline and to be able to have controlled elongation of the lifeline under load to increase the sag angle and therefore reduce the amplification.

In some prior art practices, the lifeline is made from an elastomeric material for absorbing the shock of a fallen worker. In this type of installation, it is difficult to control the vertical fall distance because the horizontal lifeline stretches as a function of its initial length.

It is a common practice to support electric power cables on spaced apart supports so that they hang like a horizontal lifeline using insulators to connect the electric power cable to the support. If an insulator of the electric power cable is broken at one of the supports, the electric power cable falls and the resulting forces.

BRIEF DESCRIPTION OF THE INVENTION

The invention provides safety apparatus for use with a lifeline which safety apparatus has a shock absorbing device for absorbing a predetermined force applied to the lifeline and indicating means for indicating the amount of tension applied to the lifeline by the tightening of a turnbuckle and visible means to show that the safety apparatus has been activated. The safety apparatus includes frangible means which break when a predetermined force is applied thereto.

In a preferred embodiment of the invention, one end of the lifeline is connected to a fixedly mounted first anchor. The other end of the lifeline is connected to one end of a shock absorbing device. The other end of the shock absorbing device is connected to one end of a turnbuckle. The other end of the turnbuckle is connected to a fixedly mounted second anchor. The turnbuckle is used to shorten the lifeline to place a desired tension on the lifeline. Indicating means are provided on the shock absorbing means to indicate the amount of tension on the lifeline.

In a preferred embodiment of the invention, the shock absorbing device comprises a housing having an end wall secured to one end of the housing which end wall has an opening formed therein. A piston rod is mounted for sliding movement through the opening and a piston is secured on the piston rod for sliding movement in the housing. Shock absorbing means are mounted on the piston rod and are located between the end wall and the piston. A plug is secured to the other end of the housing and has an opening formed therein. The plug have a generally planar end wall. Frangible securing means are provided for securing the piston rod to the plug for breaking when a predetermined force is applied thereto for permitting movement of the piston into contact with the shock absorbing means. The shock absorbing means comprise pads formed from an elastomer material that deforms when a force is applied thereto. It is understood that other types of shock absorbing means may be used. In a preferred embodiment of the invention, at least two shock absorbing pads are used. Each of the at least two shock absorbing pads has an opening extending therethrough for slidably mounting each shock absorbing pad on the piston rod. Stabilizing means are provided for the at least two shock absorbing pads and are mounted for sliding movement over the piston rod the stabilizing means comprise plate means having a plurality of openings formed therein to provide cavities into which portions of the at least two shock absorbing pads extrude. The stabilizing means comprise a plate located between adjacent shock absorbing pads, a plate between one of the shock absorbing pads and the piston and a plate located between the other of the shock absorbing pads and the end wall. Securing means are provided for securing the piston to the piston rod so that the axial extent in an inactive state between the piston and the end wall is greater than the axial combined thicknesses of the plates and the shock absorbing pads. A member is provided and has an opening extending therethrough. A portion of the piston rod is located in the opening which has an inner surface dimensioned to receive the portion of the piston rod and to permit relative linear movement therebetween. The member has a first cylindrical outer surface and a second cylindrical outer surface having a diameter greater than the diameter of the first cylindrical surface to form an abutment surface therebetween. A cavity is formed in said plug means and has a generally cylindrical surface dimensioned to provide for relative linear movement between the member and the plug means and the cavity has a bottom wall. Resilient means surround the first cylindrical surface and are in contact with the abutment surface and the bottom wall for exerting a force on said member. The frangible securing means comprise a frangible threaded bolt extending through the opening having the inner surface and in threaded engagement with the portion of the piston rod. The threaded bolt has a reduced diameter portion designed to break when a predetermined force is applied thereto. The threaded bolt has an enlarged head portion in contact with surface portions of the member so that the member will move with the piston rod. Stop means are provided for stopping the movement of the member in one direction. Visible indicating means are provided for indicating that the threaded bolt has been broken.

Tension indicating means are provided for indicating the amount of tension on the lifeline and comprises a predetermined number of grooves formed in the second cylindrical outer surface. Each of the grooves has an axial extent that is equal to the distance it will be moved in response to an amount of tension on the lifeline as the resilient means are compressed in response to the tightening of the turnbuckle. Tension applying means are provided for moving the safety apparatus to apply tension on the lifeline and the number of grooves that have been moved into the cavity as indicated by the end wall of the plug, indicates the tension on the lifeline.

In another preferred embodiment of the invention, safety apparatus for an electric power cable is provided. A plurality of spaced apart support means are used for supporting an electric power cable. Connecting means are provided for connecting the electric power cable to each of the spaced apart support means. The connecting means at every other one of the spaced apart support means include shock absorbing means. The shock absorbing means comprise one or more shock absorbing devices. When using two shock absorbing devices, each of the shock absorbing devices has one end thereof connected to the every other one of the spaced apart support means. The shock absorbing devices are connected to the electric power cable at spaced apart locations which are at a distance at least equal to the extent that the shock absorbing devices will extend.

In another preferred embodiment of the invention, the housing of the safety apparatus has a rectangular cross-sectional configuration which preferably is a square. A stationary block is secured inside the housing at a fixed location. A tube is mounted in an opening in the stationary block for sliding movement therethrough. Resilient means comprising a plurality of belleville springs are mounted on the tube. An annular plate is mounted for sliding movement inside the housing. A frangible bolt extends through the opening in the annular plate and passes through the tube. The frangible bolt is threadedly secured to a bolt on which the shock absorbing pads are mounted. The frangible bolt is tightened so that the resilient means is only slightly compressed between the stationary block and the annular plate. An angle member is secured to the outer surface of one of the sides of the housing and is used to indicate when the proper sag has been made in the horizontal life line. Also, indicating means are provided to indicate when the safety apparatus has been actuated.

BRIEF DESCRIPTION OF THE DRAWINGS

Illustrative and presently preferred embodiments of the invention are shown in the accompanying drawings in which:

FIG. 1 is an elevational view with parts in section of a preferred embodiment of the safety apparatus of this invention;

FIG. 2 illustrates a connecting means for connecting one end of a lifeline to one end of the safety apparatus;

FIG. 3 illustrates a tension applying means connected to the other end of the safety apparatus;

FIG. 6 is an elevational view with parts in section of another preferred embodiment of the safety apparatus of this invention;

FIG. 7 illustrates a connecting means for connecting one end of a lifeline to one end of the apparatus and the indicating means;

FIG. 8 is a cross-sectional view taken on the line 8—8 of FIG. 6; and

FIG. 9 illustrates a tension applying means connected to the other end of the safety apparatus.

DETAILED DESCRIPTION OF THE INVENTION

Figure 4:
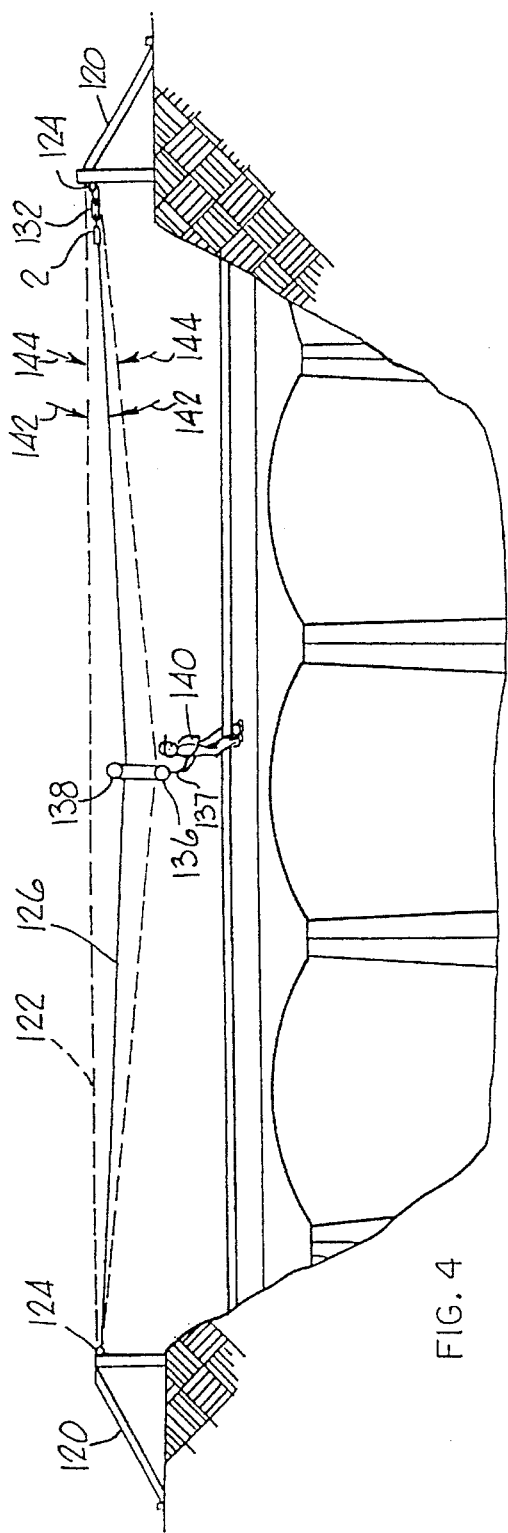
FIG. 4 illustrates one use for the safety apparatus of this invention.

In FIG. 1, there is illustrated safety apparatus 2 of this invention. The safety apparatus 2 has a housing 4 having an axial length depending on the number of shock absorbing pads 6 required for a particular installation, as explained below. The housing 4 preferably has an outer cylindrical surface 8 and an inner cylindrical surface 10. An end wall 12 is secured to the housing 4 by suitable means, such as by welding 14.

A piston rod 20 is mounted for linear sliding movement in the housing 4 and passes through an opening 22 in the end wall 12. An eye nut 24 is threaded onto the end of the piston rod 20. The piston rod 20 preferably has a cylindrical outer surface 26 and has a threaded reduced diameter portion 28 to form an abutment surface 30. A piston 32 is mounted on the reduced diameter portion 28 and is held against the abutment surface 30 by a threaded nut 34 for movement with the piston rod. Stabilizing plates 36 are mounted on the piston rod 20 for sliding movement relative thereto and are provided with openings 38 so that portions of the shock absorbing pads 6 can move into the openings when they are deformed as described below. The shock absorbing pads 6 are also mounted on the piston rod 20 for sliding movement relative thereto. A roll pin 40 is used to prevent the threaded nut 34 from loosening. When the uncompressed shock absorbing pads 6 and the stabilizing plates 36 are in a contacting relationship with each other and the piston 32, there is a space 42 to allow for the compression of the belleville springs as described below.

A plug 50 has an externally threaded portion 52 in threaded engagement with an internally threaded portion 54 of the housing 4 and moves into engagement with the abutment shoulder 56. The plug 50 has a cavity 58 formed therein which cavity 58 has a bottom wall 60 and a generally cylindrical inner surface 62. The plug 50 has a generally planar end wall 64.

A member 70 has a first generally cylindrical outer surface 72 and a second generally cylindrical outer surface 74 having a diameter substantially greater than the diameter of the first generally cylindrical outer surface 72 to form an abutment surface 76 therebetween. A portion of the first generally cylindrical outer surface 72 extends into an opening 78 in the plug 50. The member 70 has an opening 80 extending therethrough which opening 80 has a generally cylindrical inner surface 82. An end portion 84 of the piston rod 20 is located in the opening 80 and has an internally threaded portion 86. A plurality of grooves 88 are formed in the second generally cylindrical outer surface 74 and each groove has an axial extent indicative of the axial distance it will be moved when a predetermined amount of force is applied thereto. A frangible bolt 90 has an externally threaded portion 92 in threaded engagement with the internally threaded portion 86. The frangible bolt 90 has a reduced diameter portion 94 that breaks when a predetermined amount of force is applied thereto. Resilient means comprising a plurality of belleville springs 96 are located in the space defined by the cylindrical surfaces 62 and 72, the bottom wall 60 and the abutment surface 76. The resilient means apply a force on the member 70 to urge the threaded nut 34 against the plug 50 to form the space 42. A yoke 98 is secured to the plug means 50 by a pair of threaded bolts 100 which pass through openings in the yoke 98, and the housing 4. Retaining means are provided and comprise a retaining line 102 having one end secured to a red washer 104 located between an enlarged head portion 105 of the frangible bolt 90 and the end wall 106 of the member 70 and the other end secured to a washer 108 located between the enlarged head portion 110 and the yoke 98 for purposes described below. When the red washer 104 is hanging loose, this is a visible indication that the safety apparatus 2 has been activated.

The safety apparatus is assembled by first securing the piston 32 on the piston rod 20 using the threaded nut 34 and the roll pin 40 to secure it in place. A predetermined number of stabilizing plates 36 and shock absorbing pads 6 are alternately moved over the piston rod 20. The plug 50 is moved over the end portion 84 and this assembly is inserted into the housing 4 so that the piston rod 20 extends through the opening 22 in the end wall 12. As the plug 50 moves into the housing 4, it is rotated to move the external threads 52 and the internal threads 54 into threaded engagement. The belleville washers 96 are placed over the first generally cylindrical surface 72 and the member 70 is inserted into the cavity 58 so that the end portion 84 of the piston 20 is located in the opening 80. The washer 104 is positioned against the end wall 106 and the frangible bolt 90 is moved through the opening 80 and threaded into the end portion 84 using the external threads 92 and the internal threads 86 until one end of the first groove 88 is aligned with the planar end surface 64. The yoke 98 and the washer 108 are then attached using the threaded bolts 100. The eye nut 24 is then threaded onto an externally threaded portion 112 of the piston 20 and secured in place using a roll pin 114.

In operation, such as that described below, the yoke 98 is secured to a fixed anchor and the eye nut 24 is secured to one end of a lifeline. When a force is applied to the lifeline, the piston rod moves the member 70 against the belleville springs 96 to apply a compressive force thereto and to move the member 70 toward the bottom wall 60. When a sufficient amount of force is applied, the frangible bolt 90 breaks so that the piston is free to move and as the piston 32 moves with the piston rod 20, it forces the stabilizing plates 36 and the shock absorbing pads 6 toward the end wall 12 to absorb the applied force. When the frangible bolt 90 breaks, the compressed belleville springs 96 eject the member 70 out of the cavity 58 but the retaining means hold the red washer 104 attached to the yoke 98 which then hangs below the safety apparatus 2 to visibly indicate that the safety apparatus 2 has been activated. The shock absorbing pads 6 are deformed as they absorb the force being applied. Portions of the shock absorbing pads 6 enter into the openings 38 in the stabilizing plates 36 to keep the deforming shock absorbing pads 6 in a desired relationship. As the shock absorbing pads 6 deform, the distance between the extremities of the eye nut 24 and the yoke 98 increases. As the force is removed from the eye nut 24, the shock absorbing pads 6 will slowly return to their original shape and can be used again. The shock absorbing pads absorb the fall energy by heating up so that when the load is removed they cool off by conduction and convection to the surrounding air.

In FIG. 4 there is illustrated one use of the safety apparatus 2 of this invention which schematically illustrates the construction of a bridge. A pair of spaced apart anchors 120 are mounted at fixed locations. Line 122 is a line of sight between mounting means 124 on each anchor 120. Lifeline 126 has one end secured to one of the mounting means 124. As illustrated in FIG. 2, the other end 128 of the lifeline 126 is secured to the eye nut 24 using a open wedge socket 130.

As illustrated in FIG. 3, a turnbuckle 132 is secured by conventional means 134 to the yoke 98 and the other mounting means 124.

The following description is for illustration purposes only and it is understood that the various parameters will change in accordance with the conditions of use. In the illustration in FIG. 4, the lifeline 126 is 100 feet of 0.50 inch 6×19 galvanized cable and a fall arrester 136 is of the type illustrated in U.S. Pat. No. 4,589,523 and weighs 50 pounds is mounted thereon using a pulley 138. It is determined that in order for a worker 140 to be able to work comfortably while moving the pulley 138 over the lifeline 126, the sag angle 142 should not be greater than 3.50 degrees. At a sag angle of 3.5 degrees, the force applied on the safety apparatus 2 is eight times the vertical fall arresting force applied to the vertical lifeline 137. The apparatus illustrated in FIG. 4 is designed for a vertical fall force of 400 pounds being placed on the vertical lifeline 137 which would result in a force of 3200 pounds being placed on the safety apparatus 2 and the horizontal lifeline 126. Therefore, the frangible bolt 90 is designed to break when a force of 3200 pounds is applied thereto. It is calculated that, to obtain the sag angle 142 of 3.50 degrees, it is necessary to apply a force of 600 pounds on the lifeline 126. Each groove 88 has an axial extent equal that one groove 88 will be moved passed the generally planar surface 64 for each 200 pounds of tension placed on the lifeline 126. The belleville washers are designed to resist compression thereof until 400 pounds of force has been applied thereto. Therefore, to place a force of 600 pounds on the lifeline 126, the turnbuckle 132 is rotated until one grooves 88 have been moved past the generally planar end wall 64 and into the plug means 50. It is understood that the distance that the turnbuckle moves the safety apparatus to apply the tension on the lifeline 126 is substantially greater than the distance the member 70 is moved into the cavity 58.

At a sag angle 144 of 7.0 degrees, the force applied on the safety apparatus 2 is four times the force applied on the vertical lifeline 137. To move from the sag angle 142 of 3.50 degrees to a sag angle 144 of 7.0 degrees, it is necessary for the distance between the extremities of the eye nut 24 and the yoke 98 be increased a predetermined amount. In the safety apparatus 2 described above, each shock absorbing pad 6 is formed from an elastomer material, such as that marketed by Miner Enterprises under the trade designation TEKS—PAK. Each shock absorbing pad 6 is designed to deform at a certain rate so that when fully deformed it would provide the necessary increased length for each 10 feet of the lifeline 126. Therefore, in the use illustrated in FIG. 4, eleven stabilizing plates 36 and ten shock absorbing pads 6 were alternately placed on the piston rod 20. Any additional force not absorbed by the safety apparatus 2 will be absorbed by the fall arrestor 136 in the manner set forth in U.S. Pat. No. 4,589,523. It is understood that if different types of shock absorbers are used, it is only necessary to determine the amount of their deformation required to get the necessary increase in length between the extremities of the eye nut 4 and the yoke 98. In some instances, satisfactory results can be obtained using only one shock absorbing pad 6. Any elastomeric material can be used so long as it has high hystersis and the ability to turn the compressive forces into heat with the ability to rebound slowly to its original shape.

Figure 5:
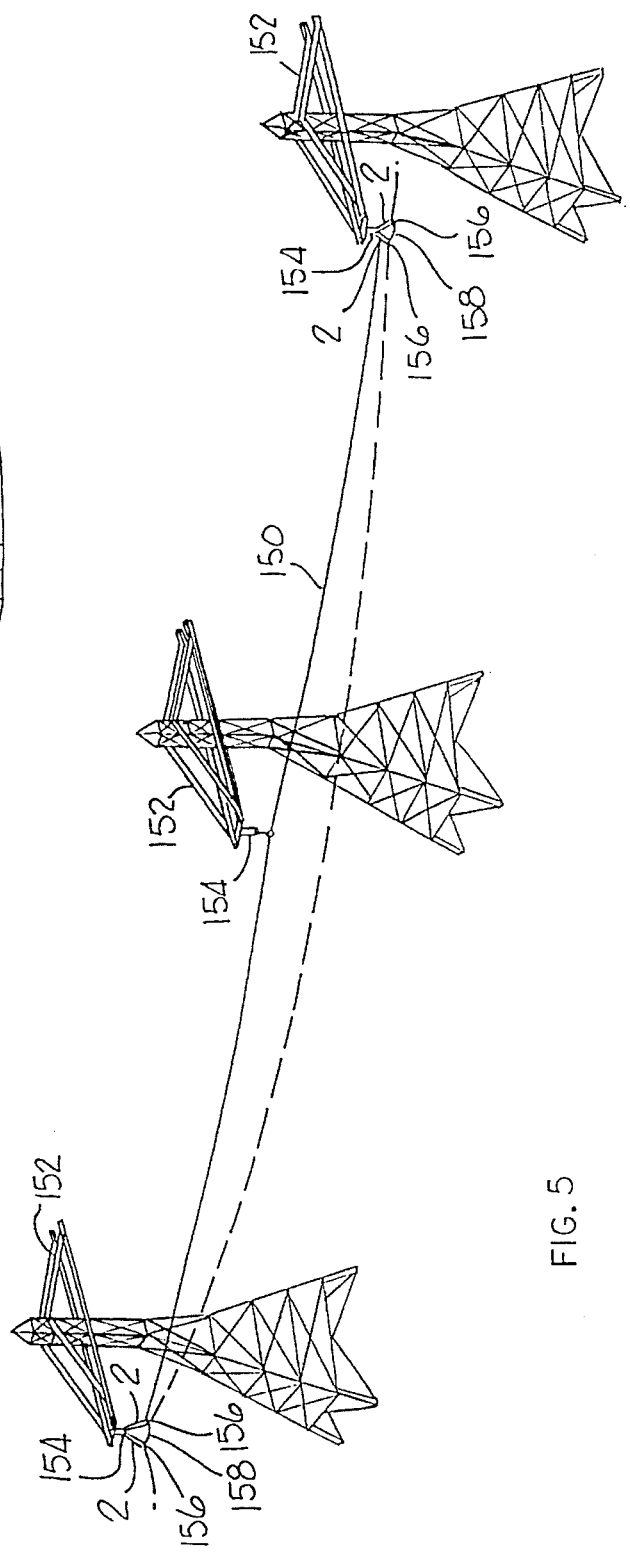
FIG. 5 illustrates another use of the safety apparatus of this invention.

Another use of the safety apparatus 2 of this invention is schematically illustrated in FIG. 5. In a normal operation, an electric power cable 150 is attached to spaced apart supports 152 by connecting means 154. If something causes the connecting means 154 to break, the electric power cable 150 moves from the solid line in FIG. 5 to the dashed line. The force generated by such a fall may be sufficient to break the electric power cable 150 or to break the connecting means 154 at the next adjacent support. To provide for such an occurrence, it is proposed to provide shock absorbing means, such as the safety apparatus 2 of this invention, at every support or every other support. As illustrated in FIG. 5, two safety apparatuses 2 would be connected to the connecting means 154 using yokes 98. The eye nuts 24 would be connected to the electric power cable 150 at spaced apart locations 156. The spaced apart locations 156 are chosen so that the portion 158 of the electric power cable 150 between the spaced apart locations has a length greater than the length the safety apparatus 2 will expand. If only one safety apparatus is used, the eye nut 24 and the yoke 98 are connected to the electric power cable 150 at spaced apart locations.

In FIGS. 6 and 9, there is illustrated a safety apparatus 170 comprising an elongated housing 172 having an outer surface 174 and an inner surface 176, each of which has a rectangular cross-sectional configuration, preferably square. An end wall 178 is secured to the elongated housing 172 preferably by welding 180.

A bolt 182 is mounted for sliding movement through an opening 184 in the end wall 178. An eye nut 186 is threaded onto the bolt 182 and secured by a roll pin 188. A plurality of shock absorbing pads 190, similar to the shock absorbing pads 6, are mounted for sliding movement over the bolt 182. Annular stabilizing plates 192 are mounted on the bolt 182 for sliding movement relative thereto and each stabilizing plate is provided with a plurality of openings 194 so that portions of the shock absorbing pads 190 can move into the openings 194 when they are deformed as described above. An annular piston 196 is mounted on the bolt 182 for movement therewith. The bolt 182 has an enlarged head portion 198 that is larger than an opening 200 in the piston 196 so that it can apply a force thereto.

A stationary block 202 having a rectangular cross-sectional configuration, preferably square, is secured to the elongated housing 172 using headed threaded bolts 204 passing through openings in one sidewall 206 and threadedly secured in threaded openings in another sidewall 208 of the elongated housing 172. A tube 210 passes through an opening 212 in the stationary block 202 and has an end portion 214 that abuts against the enlarged head portion 198. A plurality of belleville springs 216 are mounted for sliding movement over the tube 210. Another end 218 of the tube 210 abuts against an annular plate 220. A frangible bolt 222 has an externally threaded end portion 224 in threaded engagement with a threaded opening 226 in the enlarged head portion 198. The frangible bolt 222 has a reduced diameter portion 228 that breaks when a predetermined amount of force is applied thereto. The frangible bolt 222 has an enlarged head portion 230 so that it can apply a force on the annular plate 220. Each of the sidewalls 206 and 208 has an opening 232 formed therein. The end 234 of a turnbuckle is positioned in the elongated housing 172 and is secured thereto by a bolt 236 passing through the openings 232. An angle member 238 is secured to the outer surface 240 of the elongated housing 172. The angle member 238 has an inclined surface 242 that is inclined to the outer surface 240 at an angle equal to the sag angle to be placed on the lifeline. Thus, for a 3.5 degree sag angle, as described above, the inclined surface would be 3.5 degrees. A level is placed on the inclined surface 242 and the turnbuckle 234 is tightened until the level shows the inclined surface 242 to be level.

Visible means 248 are provided for indicating when the frangible bolt 222 has been broken. A bronze bushing 250 is placed over the bolt 182 and is passed through an opening 252 in the end wall 178 until the central flange portion 254 is in contact with the end wall 178. There is a friction fit between the bronze bushing 250 and the opening 252. The space 244 between the end of the bronze bushing 250 and the last stabilizing plate 192 is sufficient to allow the complete compression of the belleville springs 216. This would permit movement of 15 inches for a worker attached to the lifeline as described above. A cover 256 has a friction fit in a recess 258 in the end plate 178. A spring 262 bears against the flange 254 and a portion 264 of the cover. A plastic flag 266 is wrapped around the spring 262. When the frangible bolt 222 breaks, the end stabilizing plate 192 moves against the bronze bushing 250 to move the cover 256 out of the recess 258 and the spring 262 moves the cover 256 away from the bronze bushing 250 and against the eye nut 186 and the flag 266 is also moved to permit the flag 266 to unfurl.

The safety apparatus 170 is assembled outside of the housing. The frangible bolt 222 is passed through the opening in the annular plate 220, the tube 210 is placed over the frangible bolt 222, the tube 210 and the frangible bolt 222 are passed through the opening 212 in the stationary block 202 and the threaded portion 224 is threaded into the threaded opening 226 in the enlarged head portion 198 until the belleville springs are under a minimal compression to urge the enlarged head portion 198 against the stationary block 202. The piston 196, the stabilizing plates 192 and the shock absorbing pads 190 are then placed over the bolt 182. The assembled components are then inserted into the elongated housing 172 until the openings in the sidewalls 206 and 208 are aligned with the openings in the stationary block 202. The bolts 204 are then used to secure the stationary block 202 to the elongated housing 172 and the eye nut 186 is secured on the bolt 182. As illustrated in FIG. 6, there is a space 244 for permitting limited movement of all of the components in the elongated housing 172, except for the stationary block 202, when a force less than that required to break the frangible bolt 222, is placed on the bolt 182.

The safety apparatus 170 is used in the same manner as described above in relation to the safety apparatus 2.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Safety apparatus comprising:

a housing;

an end wall secured to one end of said housing and having an opening formed therein;

a piston rod mounted for sliding movement through said opening;

piston means on said piston rod for movement therewith;

shock absorbing means mounted on said piston rod and located between said end wall and said piston means;

frangible means mounted on said piston means for movement therewith and for breaking when a predetermined force is applied thereto so that said piston means apply a force to said shock absorbing means;

abutment means mounted in said housing at a fixed location;

resilient means for urging said piston means into contact with said abutment means but permitting movement of said piston means in a direction away from said abutment means prior to the breaking of said frangible means; and said end wall comprising stop means for limiting the movement of said piston means.

2. Apparatus as in claim 1 wherein said shock absorbing means comprise:

at least two shock absorbing pads formed from a material that deforms when a force is applied thereto;

each of said at least two shock absorbing pads having an opening extending therethrough for slidably mounting each shock absorbing pad on said piston rod; and stabilizing means for stabilizing each of said at least two shock absorbing pads, said stabilizing means being mounted for sliding movement over said piston rod.

3. Apparatus as in claim 2 wherein said stabilizing means comprise:

an annular plate having a plurality of openings formed therein to provide cavities into which portions of said at least two shock absorbing pads extrude.

4. Apparatus as in claim 3 wherein:

the distance between said abutment means and said end wall is greater than the combined thickness of said plates, said at least two shock absorbing pads and said piston means to provide space for said movement of said piston means.

5. Apparatus as in claim 1 and further comprising:

a plug secured to the other end of said housing;

a member having an opening extending therethrough;

said opening having an inner surface dimensioned to receive a portion of said piston rod;

said member having a first cylindrical outer surface and a second cylindrical outer surface having a diameter greater than the diameter of said first cylindrical surface to form an abutment surface therebetween;

said plug having a cavity formed therein;

said cavity having a generally cylindrical surface dimensioned to provide for relative linear movement between said member and said plug; and said cavity having a bottom wall.

6. Apparatus as in claim 5 wherein:

said resilient means surrounding said first cylindrical surface and in contact with said abutment surface and said bottom wall.

7. Apparatus as in claim 6 wherein said frangible means comprise;

a threaded bolt extending through said opening having said inner surface and in threaded engagement with said portion of said piston rod;

said threaded bolt having a reduced diameter portion designed to break when a predetermined force is applied thereto; and said threaded bolt having an enlarged head portion in contact with surface portions of said member so that said member will move with said piston rod.

8. Apparatus as in claim 7 and further comprising:

visible means for indicating that said threaded bolt has been broken.

9. Apparatus as in claim 1 and further comprising:

at least a pair of spaced apart fixedly mounted anchors;

first connecting means for connecting said housing to one of said anchors;

second connecting means for connecting one end of a lifeline to the other of said anchors;

third connecting means for connecting the other end of said lifeline to said piston rod; and tension applying means for applying tension to said lifeline to provide a sag angle in said lifeline.

10. Apparatus as in claim 9 and further comprising:

said housing having a rectangular cross-sectional configuration having inner and outer generally planar surfaces; and angle plate means mounted on a portion of one of said outer surfaces and having an inclined surface for supporting a level to indicate when the lifeline has a desired sag angle.

11. Apparatus as in claim 9 and further comprising: tension indicating means for indicating the amount of tension on said lifeline.

12. Apparatus as in claim 1 wherein: said abutment means having an opening formed therein;

tube means passing through said opening;

said frangible means comprising a threaded bolt extending through said tube means;

said bolt having an enlarged head portion;

an annular plate mounted on said bolt and having an opening therein through which said bolt passes;

a portion of said annular plate being located between said tube and said enlarged head portion;

securing means for securing an end portion of said threaded bolt to said piston means; and said resilient means being located between said abutment means and said annular plate.

13. Apparatus as in claim 12 wherein: the distance between said abutment means and said end wall is greater than the combined thickness of said plates, said at least two shock absorbing pads and said piston means to provide space for said movement of said piston means.

14. Apparatus as in claim 13 wherein: at least a pair of spaced apart fixedly mounted anchors;

first connecting means for connecting said housing to one of said anchors;

second connecting means for connecting one end of a lifeline to the other of said anchors;

third connecting means for connecting the other end of said lifeline to said piston rod;

tension applying means for applying tension to said lifeline to provide a sag angle in said lifeline;

said housing having a rectangular cross-sectional configuration having inner and outer generally planar surfaces; and angle plate means mounted on a portion of one of said outer surfaces and having an inclined surface for supporting a level to indicate when the lifeline has a desired sag angle.

15. Apparatus as in claim 12 and further comprising:

visible means for indicating that said frangible means has been broken.

16. Safety apparatus as i claim 1 and further comprising:

a plurality of spaced apart support means for supporting an electric power cable;

connecting means for connecting said electric power cable to each of said spaced apart support means; and shock absorbing means connected to said connecting means at least at every other one of said spaced apart support means.

* * * * *